US012722262B2

(12) United States Patent
Li

(10) Patent No.: US 12,722,262 B2

(45) Date of Patent: Sep. 1, 2026

(54) PARALLEL CRIMPING PLIER WITH INTERCHANGEABEL MOUTHPIECES

(71) Applicant: Yu-Hsin Li, Changhua County (TW)

(72) Inventor: Yu-Hsin Li, Changhua County (TW)

( * ) Notice: Subject to any disclaimer, the term of this patent is extended or adjusted under 35 U.S.C. 154(b) by 690 days.

(21) Appl. No.: 18/201,165

(22) Filed: May 23, 2023

(65) Prior Publication Data

US 2024/0391073 A1 Nov. 28, 2024

(51) Int. Cl.
*B25B 27/14* (2006.01)

(52) U.S. Cl.
CPC .................................. *B25B 27/146* (2013.01)

(58) Field of Classification Search
CPC ....... B25B 27/146; B25B 7/12; H01R 43/042; Y10T 29/53209; Y10T 29/53222; Y10T 29/53235; Y10T 29/53257
See application file for complete search history.

(56) References Cited

U.S. PATENT DOCUMENTS

| | | | | |
|---|---|---|---|---|
| 4,283,933 A * | 8/1981 | Wiener | B25B 7/12 | |
| | | | 81/419 | |
| 6,151,950 A * | 11/2000 | Wilhelm | H01R 43/042 | |
| | | | 29/751 | |
| 9,543,725 B2 * | 1/2017 | Li | H01R 43/042 | |
| 2009/0308132 A1 * | 12/2009 | Lai | H01R 43/042 | |
| | | | 81/355 | |

* cited by examiner

*Primary Examiner* — Donghai D Nguyen

(74) *Attorney, Agent, or Firm* — Ying-Ting Chen

(57) ABSTRACT

A parallel crimping plier includes a crimping part having a space defined therein, an opening, a fixed handle located below the crimping part, and a movable handle pivotally connected to the space. A crimping assembly is connected to a mouthpiece assembly and positioned within the space of the crimping part. A pivoting member is positioned within the space of the crimping part and pivotally connected at both ends to the movable handle and a lower crimping member. A releasing assembly is pivotally connected to the space of the crimping part and has one end abutting against one side of the mouthpiece assembly.

10 Claims, 8 Drawing Sheets

PARALLEL CRIMPING PLIER WITH INTERCHANGEABEL MOUTHPIECES

FIELD OF THE INVENTION

The present invention relates to a parallel crimping plier, and more particularly, to a crimping plier with interchangeable mouthpieces.

BACKGROUND OF THE INVENTION

Most conventional crimping tools for miniature terminals use rotating jaws to crimp the terminals. However, these conventional crimping tools often result in asymmetrical crimps on both sides of the terminal. Additionally, the terminals near the pivot point tend to be crimped tighter and may deform or bend, making them unable to be inserted and glued. This ultimately affects the process yield and increases manufacturing costs.

The present invention intends to provide a crimping plier with interchangeable mouthpieces to eliminate the problems mentioned above.

SUMMARY OF THE INVENTION

The present invention relates to a parallel crimping plier and comprises a crimping part having a space defined therein, an opening, a fixed handle located below the crimping part, and a movable handle pivotally connected to the space. A crimping assembly is connected to a mouthpiece assembly and positioned within the space of the crimping part. A pivoting member is positioned within the space of the crimping part and pivotally connected at both ends to the movable handle and a lower crimping member. A releasing assembly is pivotally connected to the space of the crimping part and has one end abutting against one side of the mouthpiece assembly.

The primary object of the present invention is to provide a crimping plier with interchangeable mouthpieces, wherein the parallel crimping of the present invention improves the shortcomings of the conventional crimping tools.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
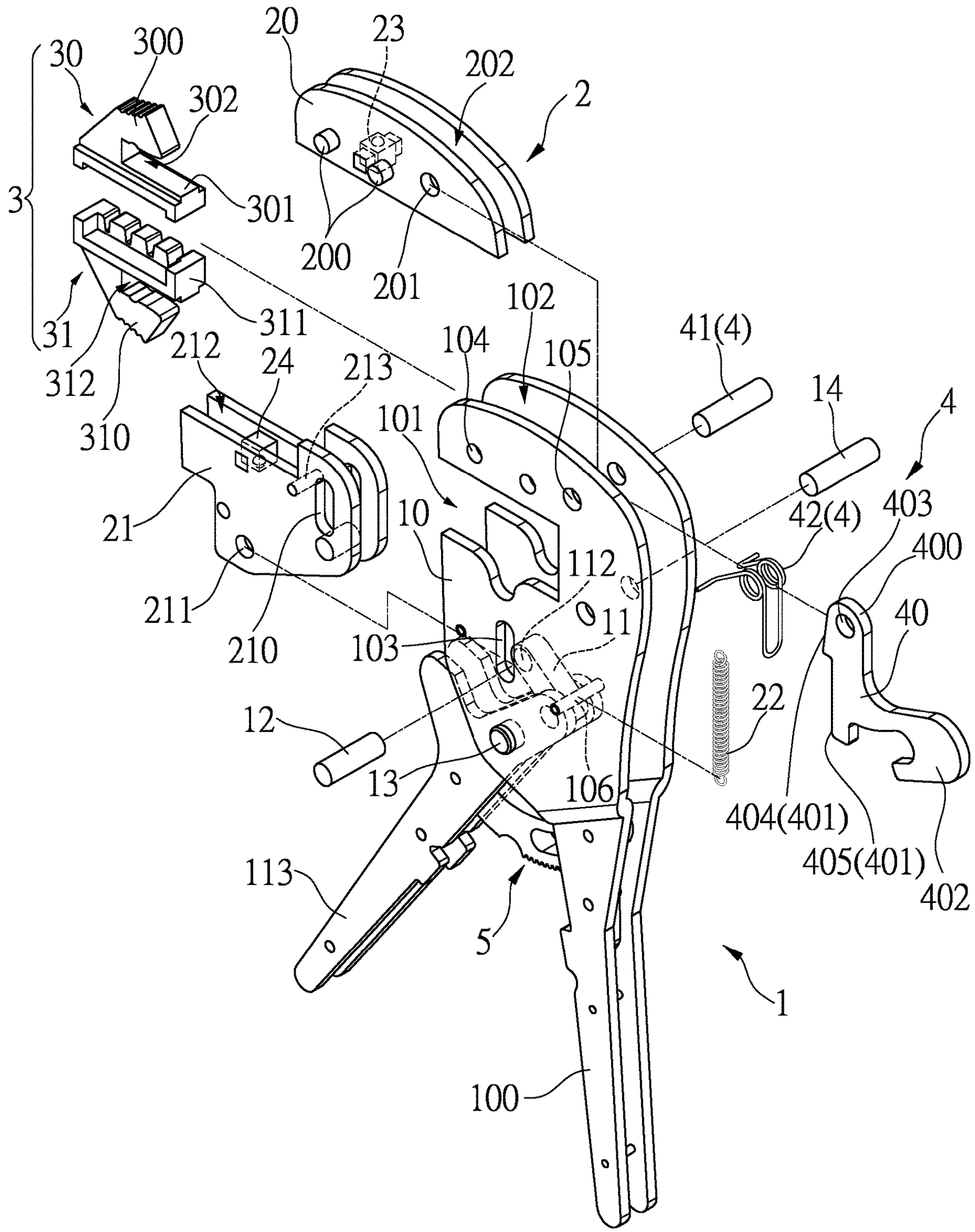
FIG. 1 is an exploded view to show the crimping plier of the present invention.
Figure 2:
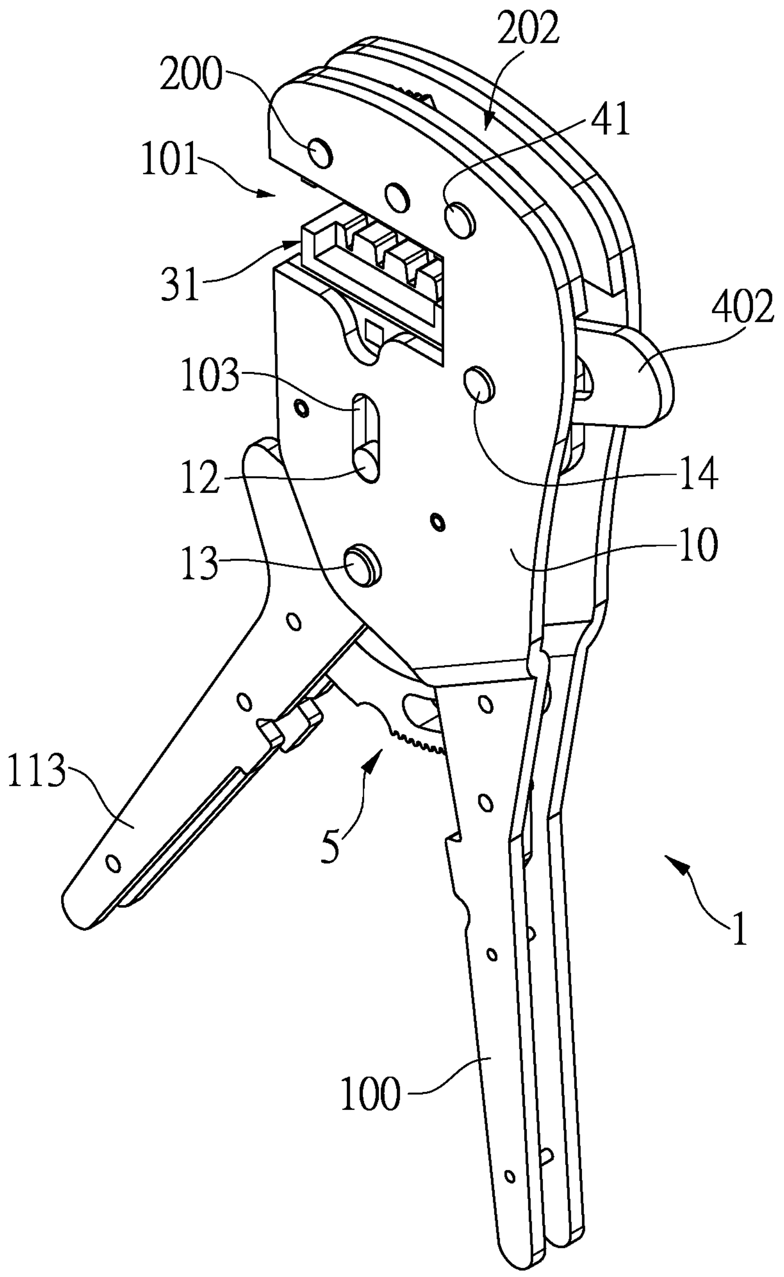
FIG. 2 is a perspective view to show the crimping plier of the present invention.
Figure 3:
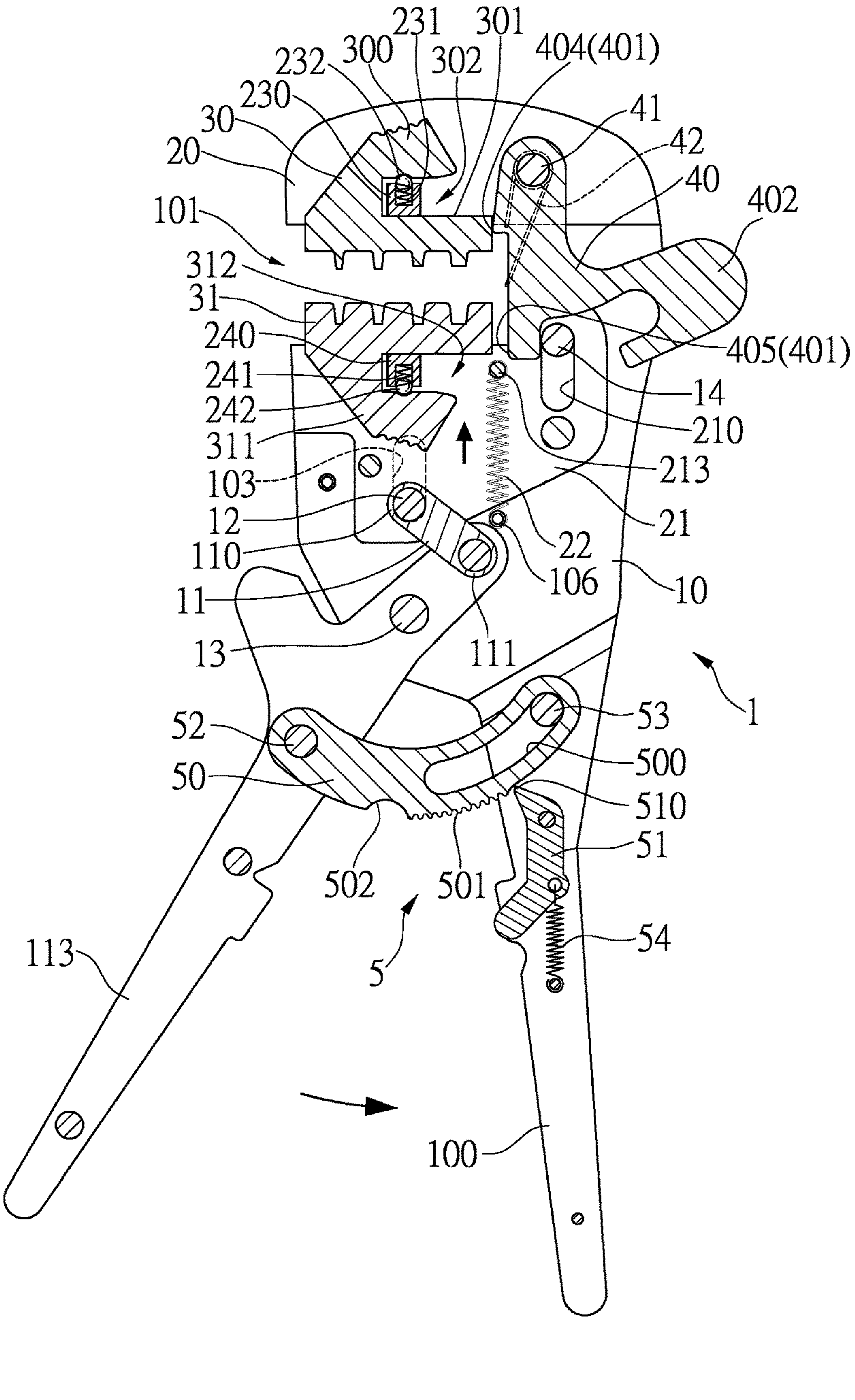
FIG. 3 show a plane view of the crimping plier of the present invention.
Figure 4:
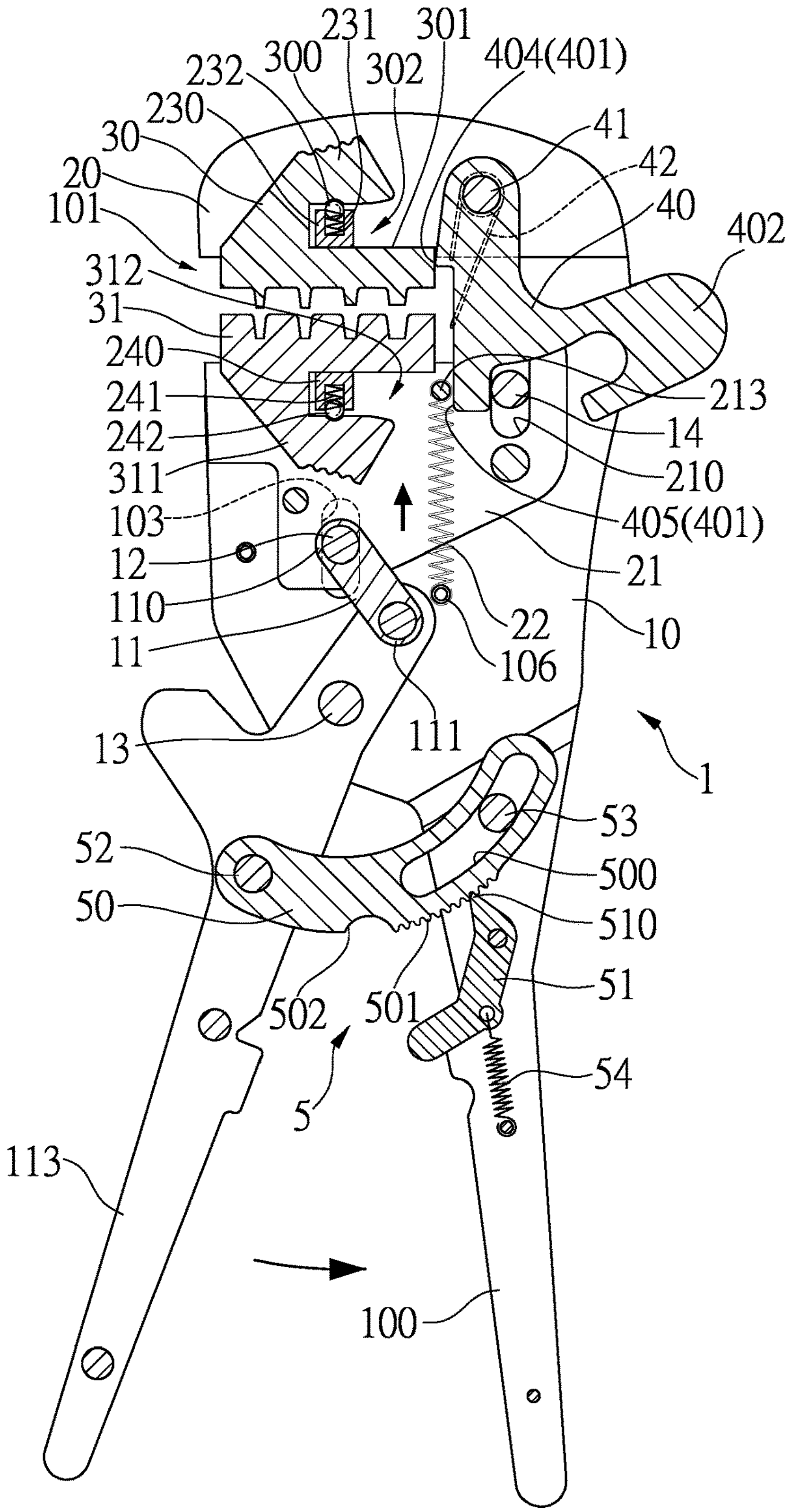
FIG. 4 shows a first operative status of the crimping plier of the present invention.
Figure 5:
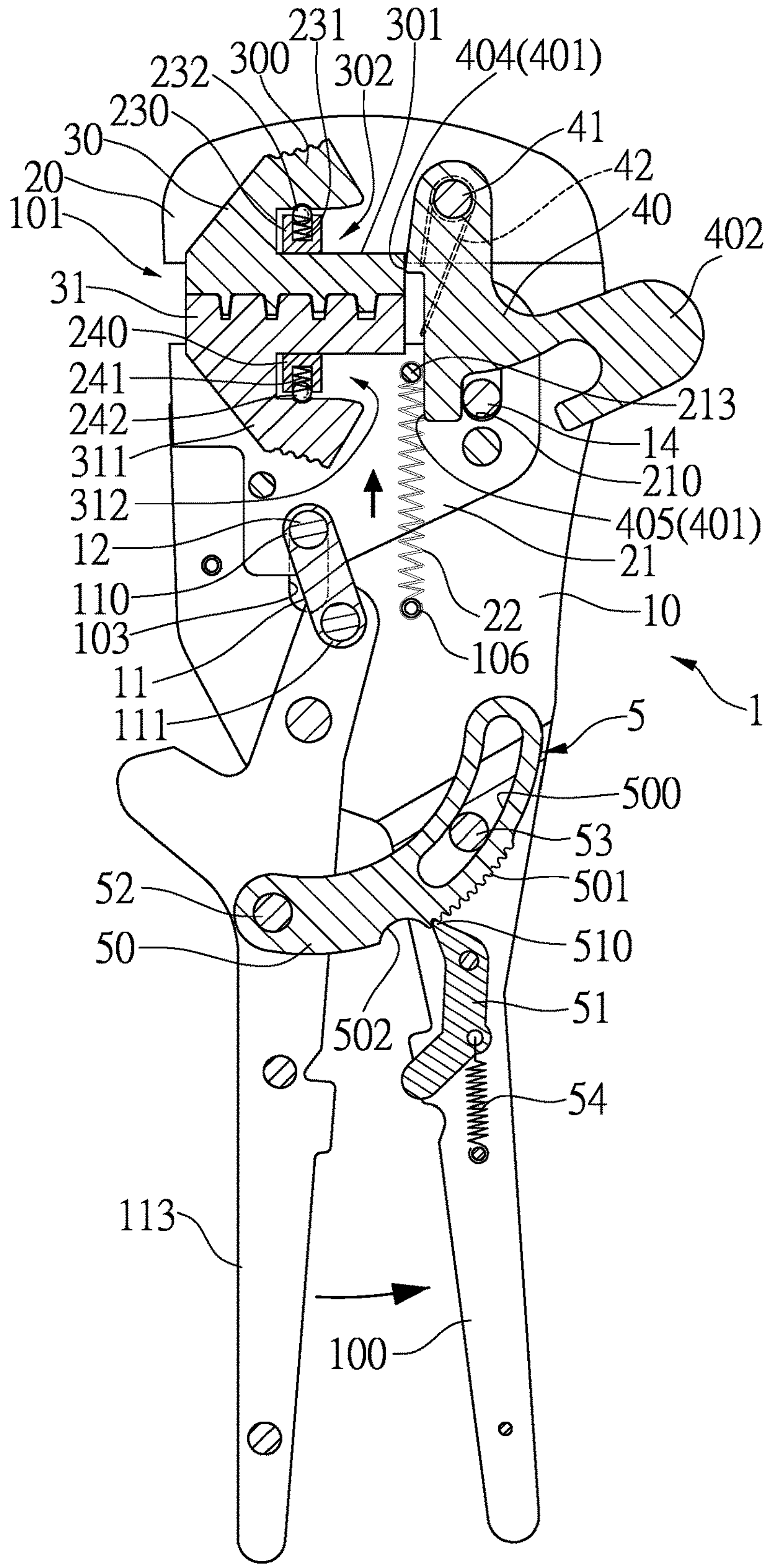
FIG. 5 shows a second operative status of the crimping plier of the present invention.

Referring to FIGS. 1 to 8, the parallel crimping plier 1 of the present invention comprises a crimping part 10 having a space 102 defined therein, an opening 101, a fixed handle 100 located below the crimping part 10, and a movable handle 113 pivotally connected to the space 102 of the crimping part 10. The crimping part 10 includes a displacement slot 103 located below the opening 101. A pivoting member 11 is located in the space 102 of the crimping part 10 and includes a first end 110 and a second end 111. The first end 110 of the pivoting member 11 includes a pivot hole 112, and the second end 111 of the pivoting member 11 is pivotally connected to one end of the movable handle 113. A first pivot connecting member 12 passes through the displacement slot 103 of the crimping part 10, and is connected to the pivot hole 112 so as to pivotably connect the pivoting member 11 to the crimping part 10. The second end 111 of the pivoting member 11 is pivotally connected to the movable handle 113 which is pivotably connected to the crimping part 10 by a second pivot connecting member 13.

When pulling the movable handle 113, the second end 111 of the pivoting member 11 is pivoted downward and the first end 110 of the pivoting member 11 pivots upward, so that the first pivot connecting member 12 moves upward along the displacement slot 103 of the crimping part 10.

A crimping assembly 2 includes an upper crimping member 20, a lower crimping member 21 and a first spring 22. The upper crimping member 20 is located in the space 102 of the crimping part 10 and fixed at a position above the opening 101. The lower crimping member 21 is located in the space 102 of the crimping part 10 and movably located below the opening 101. A fixing hole 104 and a first pivot hole 105 are located above the opening 101 of the crimping part 10.

The upper crimping member 20 includes a fixing part 200, a second pivot hole 201, an upper room 202 and a first quick-release 23 which is located in the upper room 202. The fixing part 200 of the upper crimping member 20 is fixed to the fixing hole 104 of the crimping part 10, so that the upper crimping member 20 is located in the space 102 and fixed within the opening 101. The second pivot hole 201 of the upper crimping member 20 is located corresponding to the first pivot hole 105. The first quick-release 23 includes a first base 230, a first resilient member 231 and a first bead 232, wherein the first bead 232 is biased by the first spring 231 located in the first base 230.

The lower crimping member 21 includes a restriction slot 210, a third pivot hole 211, a lower room 212 and a second quick-release 24. A restriction portion 14 is located in the space 102. The lower crimping member 21 includes a restriction slot 210, and the restriction portion 14 of the crimping part 10 extends through the restriction slot 210 of the lower crimping member 21. The lower crimping member 21 is located in the space 102 and is movably located below the opening 101. The third pivot hole 211 of the lower crimping member 21 is located corresponding to the pivot hole 112 of the pivoting member 11 and the displacement slot 103 of the crimping part 10. The first pivot connecting member 12 extends through the displacement slot 103 and the pivot hole 112 and is pivotably connected to the third pivot hole 211. The second quick-release 24 includes a second base 240, a second resilient member 241 and a second bead 242. The second bead 242 is biased by the second resilient member 241 located in the second base 240.

The crimping part 10 includes a first rod 106 located in the space 102. The lower crimping member 21 includes a second rod 213. The first spring 22 of the crimping assembly 2 is connected between the first and second rods 106, 213.

A mouthpiece assembly 3 is located in the space 102 of the crimping part 10 and fixed between the upper crimping member 20 and the lower crimping member 21 and positioned at the opening 101. The mouthpiece assembly 3 comprises an upper mouthpiece 30 and a lower mouthpiece 31. The upper crimping member 20 includes a first quick-release 23, and the lower crimping member 21 includes a second quick-release 24. The upper mouthpiece 30 includes a first part 300 and a second part 301, and a first room 302 is formed between the first part 300 and the second part 301. The first quick-release 23 is located in the first room 302. The underside of the first part 300 of the upper mouthpiece 30 contacts the first bead 232 of the first quick-release 23. The lower mouthpiece 31 includes a third part 310 and a fourth part 311. A second room 312 is formed between the third part 310 and the fourth part 311. The second quick-release 24 is located in the second room 312. The top surface of the fourth part 311 of the lower mouthpiece 31 contacts the second bead 242 of the second quick-release 24. In other words, the mouthpiece assembly 3 is located between the first and second quick-release 23, 24.

A releasing assembly 4 includes a releasing component 40 located in the space 102 of the crimping part 10. The releasing component 40 has a pivot end 400, a contacting end 401 and an operating end 402. The pivot end 400 of the releasing component 40 is pivotally connected to the upper crimping member 20. Specifically, the pivot end 400 of the releasing component 40 includes a fourth pivot hole 403. A first pivot 41 passes through the first pivot hole 105 of the crimping part 10, the second pivot hole 201 of the upper crimping member 20 and the fourth pivot hole 403 of the releasing component 40 so that the releasing component 40 is pivotally located in the space 102 of the crimping part 10. The contacting end 401 abuts against one side of the mouthpiece assembly 3. The operating end 402 is exposed outside the crimping part 10. The releasing assembly 4 includes a second spring 42 which is connected to the pivot end 400 of the releasing component 40. The second spring 42 includes two legs which are secured by the underside of the upper crimping member 20. The contacting end 401 of the releasing component 40 has a first segment 404 and a second segment 405. The first and second segments 404, 405 respectively abut one side of the upper mouthpiece 30 and the lower mouthpiece 31 when the releasing component 40 is pivoted clockwise about the first pivot 41.

Figure 6:
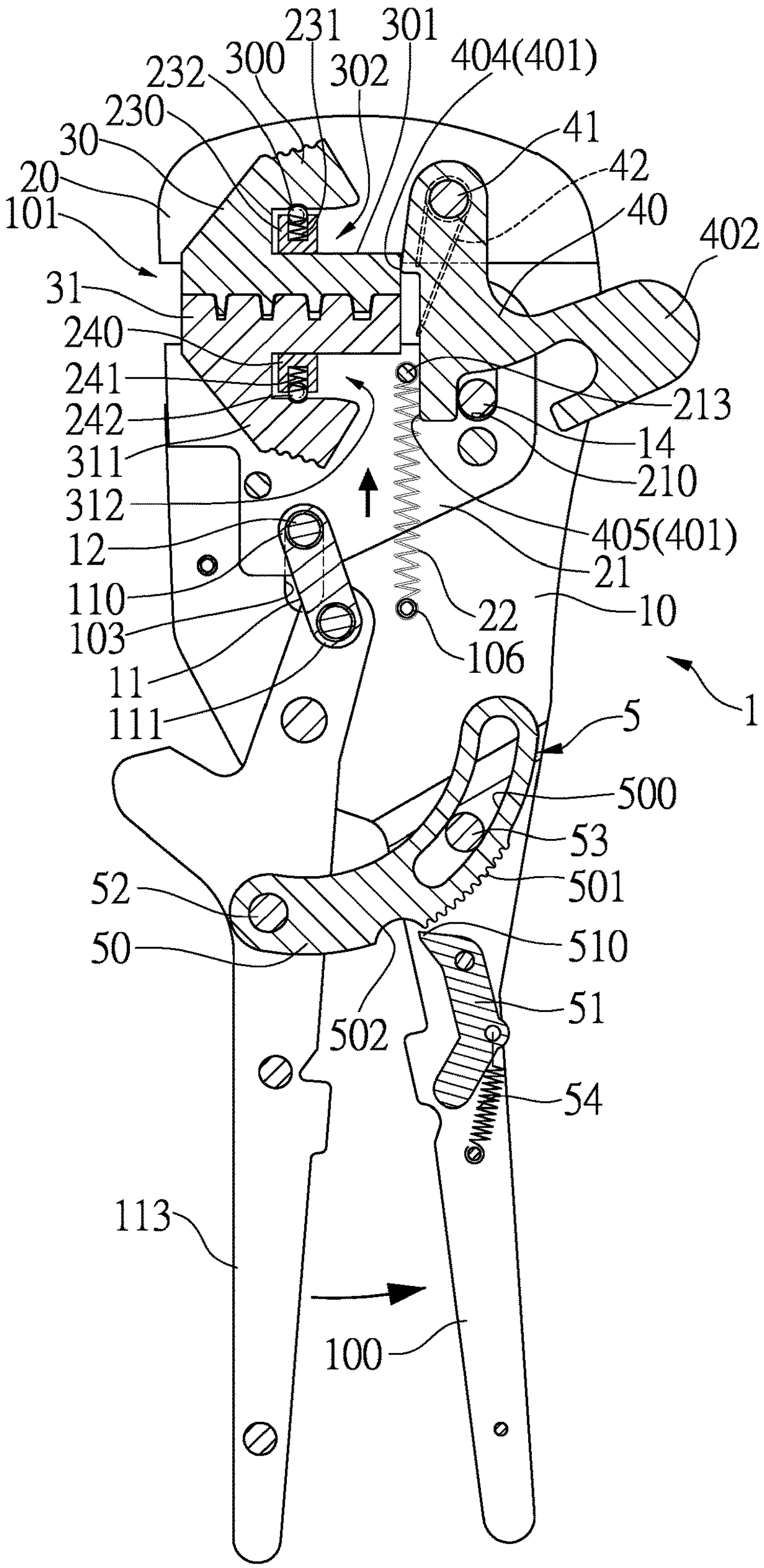
FIG. 6 shows a third operative status of the crimping plier of the present invention.
Figure 7:
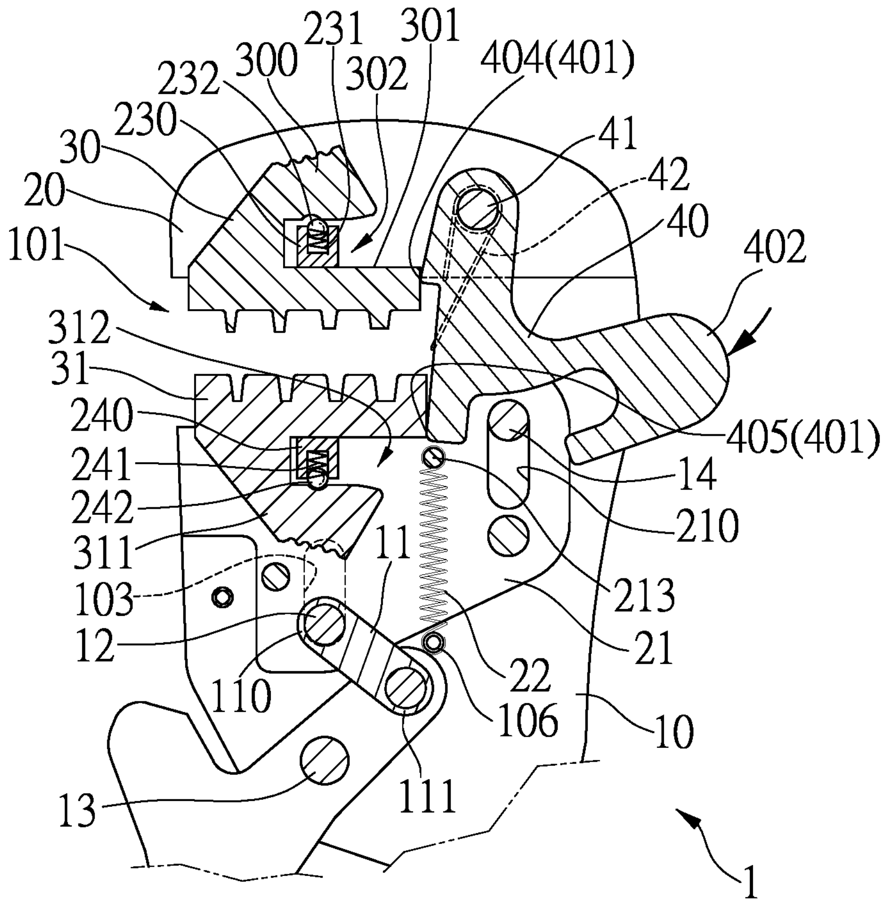
FIG. 7 shows that the releasing component is to be pivoted.
Figure 8:
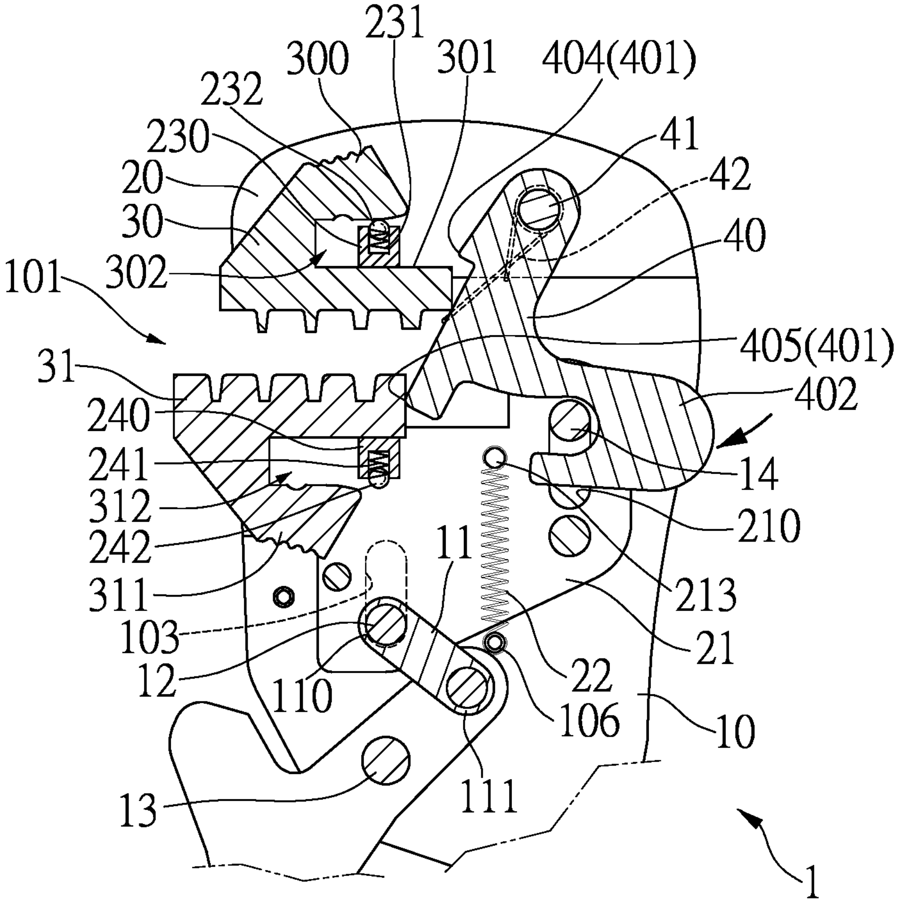
FIG. 8 shows that the releasing component is pivoted to release the mouthpiece.

A displacement assembly 5 includes a plate 50, a fixing member 52 and a second pivot 53. The plate 50 includes a curved slot 500 defined therethrough. Multiple teeth 501 and a recess 502 are defined in the outside of the plate 50. The fixing member 52 fixes the first end of the plate 50 to the movable handle 113. The second pivot 53 extends through the curved slot 500 and is connected to the fixed handle 100. The displacement assembly 5 further includes a pawl 51 and a second spring 54. The pawl 51 is pivotably connected to the fixed handle 100 and includes a tip end 510 formed to one end thereof. The tip end 510 is removably engaged with the teeth 510 in one direction. When the recess 502 is located corresponding to the teeth 510 as shown in FIG. 6, the tip end 510 is disengaged from the teeth 510. The third spring 54 is connected between the fixed handle 100 and the pawl 51 so as to provide a return force to the pawl 51.

When in use, a micro terminal (not shown) is put between the upper mouthpiece 30 and the lower mouthpiece 31 of the mouthpiece assembly 3, the movable handle 113 is pulled to pivot the second end 111 of the pivoting member 11 downward, and the first end 110 is pivoted upward. The first pivot connecting member 12 moves upward and along the displacement slot 103. The lower crimping member 21 that is pivotably connected to the first pivot connecting member 12 drives the lower mouthpiece 31 upward to reduce the distance between the upper mouthpiece 30 and the lower mouthpiece 31, so as to crimp the terminal. After completing the crimping action, the movable handle 113 is released, the first spring 22 moves the lower crimping member 21 downward. By pulling and releasing the movable handle 113 to achieve a parallel crimping action by the lower crimping member 21 and the upper crimping member 20, so that the two sides of the terminal can be evenly crimped to improve the shortcoming of the conventional crimping tools.

During the upward movement and downward movement of the lower crimping member 21, thanks to the cooperation of the restriction portion 14 in the space 102 and the restriction slot 210 of the lower crimping member 21, the lower crimping member 21 does not swing during action.

When replacing the upper mouthpiece 30 and lower mouthpiece 31 of the mouthpiece assembly 3, the user pivots the operation end 402 of the releasing component 40 clockwise, the second spring 42 is twisted and tightened, the contacting end 402 of the releasing component 40 pushes against the mouthpiece assembly 3 toward the direction outside the opening 101, until the upper mouthpiece 30 and lower mouthpiece 31 of the mouthpiece assembly 3 are respectively released from the first quick-release 23 of the upper crimping member 20 and the second quick-release 24 of the lower crimping member 21. The user releases the operation end 402 of the releasing component 40, and the torque of the second spring 42 is released to pivot the upper mouthpiece 30 upward to complete the replacement operation of the mouthpiece assembly 3.

During the process that the upper mouthpiece 30 and the lower mouthpiece 31 move outward towards the opening 101 due to the pushing of the first segment 404 and the second segment 405 of the releasing component 40, when the first part 300 of the upper mouthpiece 30 and the fourth part 311 of the lower mouthpiece 31 are released from first bead 232 of the first quick-release 23 and the second bead 242 of the second quick-release 24, the first and second beads 232, 242 move upward and push the first part 300 of the upper mouthpiece 30 and the fourth part 311 of the lower mouthpiece 31 by the first and second resilient members 231, 241. Therefore, the upper mouthpiece 30 and the lower mouthpiece 31 can be quickly disengaged from the upper crimping member 20 and the lower crimping member 21.

While we have shown and described the embodiment in accordance with the present invention, it should be clear to those skilled in the art that further embodiments may be made without departing from the scope of the present invention.

What is claimed is:

1. A parallel crimping plier (1) comprising:

a crimping part (10) having a space (102) defined therein, an opening (101), a fixed handle (100) located below the crimping part (10), and a movable handle (113) pivotally connected to the space (102) of the crimping part (10);

a crimping assembly (2) including an upper crimping member (20) and a lower crimping member (21), the upper crimping member (20) located in the space (102) of the crimping part (10) and fixed at a position above the opening (101), the lower crimping member (21)

located in the space (102) of the crimping part (10) and movably located below the opening (101);

a mouthpiece assembly (3) located in the space (102) of the crimping part (10) and fixed between the upper crimping member (20) and the lower crimping member (21) and positioned at the opening (101);

a pivoting member (11) located in the inner space (102) of the crimping part (10) and pivotally connected to both the movable handle (113) and the lower crimping member (21), and a releasing assembly (4) including a releasing component (40) located in the space (102) of the crimping part (10), the releasing component (40) having a pivot end (400), a contacting end (401) and an operating end (402), the pivot end (400) of the releasing component (40) pivotally connected to the upper crimping member (20), the contacting end (401) abutting against one side of the mouthpiece assembly (3), the operating end (402) being exposed outside the crimping part (10).

2. The parallel crimping plier as claimed in claim 1, wherein the mouthpiece assembly (3) comprises an upper mouthpiece (30) and a lower mouthpiece (31), the contacting end (401) of the releasing component (40) has a first segment (404) and a second segment (405), the first and second segments (404, 405) respectively abut one side of the upper mouthpiece (30) and the lower mouthpiece (31).

3. The parallel crimping plier as claimed in claim 2, wherein the upper crimping member (20) includes a first quick-release (23), the lower crimping member (21) includes a second quick-release (24), the first quick-release (23) includes a first base (230), a first resilient member (231) and a first bead (232), the first bead (232) is biased by the first spring (231) located in the first base (230), the second quick-release (24) includes a second base (240), a second resilient member (241) and a second bead (242), the second bead (242) is biased by the second resilient member (241) located in the second base (240), the upper mouthpiece (30) includes a first part (300) and a second part (301), a first room (302) is formed between the first part (300) and the second part (301), the upper releasing member (20) and the first quick-release (23) are located in the first room (302), an underside of the first part (300) of the upper mouthpiece (30) contacts the first bead (232) of the first quick-release (23), the lower mouthpiece (31) includes a third part (310) and a fourth part (311), a second room (312) is formed between the third part (310) and the fourth part (311), the second quick-release (24) is located in the second room (312), a top surface of the fourth part (311) of the lower mouthpiece (31) contacts the second bead (242) of the second quick-release (24).

4. The parallel crimping plier as claimed in claim 1, wherein the crimping part (10) includes a fixing hole (104) and a first pivot hole (105) located above the opening (101), the upper crimping member (20) includes a fixing part (200) and a second pivot hole (201), the pivot end (400) of the releasing component (40) includes a fourth pivot hole (403), the fixing part (200) of the upper crimping member (20) is fixed to the fixing hole (104) of the crimping part (10), a first pivot (41) passes through the first pivot hole (105) of the crimping part (10) and the fourth pivot hole (403) of the releasing component (40), and the second pivot hole (201) of the upper crimping member (20), the releasing component (40) is pivotally located in the space (102) of the crimping part (10).

5. The parallel crimping plier as claimed in claim 1, wherein the crimping part (10) includes a displacement slot (103) located below the opening (101), the lower crimping member (21) includes a third pivot hole (211), the pivoting member (11) includes a first end (110) and a second end (111), the first end (110) of the pivoting member (11) includes a pivot hole (112), the second end (111) of the pivoting member (11) is pivotally connected to one end of the movable handle (113), a first pivot connecting member (12) passes through the displacement slot (103) of the crimping part (10), the pivot hole (112) of the pivoting member (11) and the third pivot hole (211) of the lower crimping member (21).

6. The parallel crimping plier as claimed in claim 1, wherein the crimping assembly (2) includes a first spring (22), the crimping part (10) includes a first rod (106) located in the space (102), the lower crimping member (21) includes a second rod (213), the first spring (22) is connected between the first and second rods (106, 213).

7. The parallel crimping plier as claimed in claim 1, wherein a restriction portion (14) is located in the space (102), the lower crimping member (21) includes a restriction slot (210), the restriction portion (14) of the crimping part (10) extends through the restriction slot (210) of the lower crimping member (21).

8. The parallel crimping plier as claimed in claim 1, wherein the releasing assembly (4) includes a second spring (42) which is connected to the pivot end (400) of the releasing component (40), the second spring (42) includes two legs which are secured by an underside of the upper crimping member (20).

9. The parallel crimping plier as claimed in claim 1 further comprising a displacement assembly (5) which includes a plate (50), a fixing member (52) and a second pivot (53), the plate (50) including a curved slot (500), multiple teeth (501) and a recess (502) are defined in an outside of the plate (50), the fixing member (52) fixing a first end of the plate (50) to the movable handle (113), the second pivot (53) extending through the curved slot (500) and connected to the fixed handle (100).

10. The parallel crimping plier as claimed in claim 9, wherein the displacement assembly (5) includes a pawl (51) and a second spring (54), the pawl (51) is pivotably connected to the fixed handle (100) and includes a tip end (510) formed to end thereof, the tip end (510) is removably one-directionally engaged with the teeth (510), when the recess (502) is located corresponding to the teeth (510), the tip end (510) is disengaged from the teeth (510), the third spring (54) is connected between the fixed handle (100) and the pawl (51).

* * * * *